(12) United States Patent
Chaudhry et al.

(10) Patent No.: US 6,684,297 B2
(45) Date of Patent: Jan. 27, 2004

(54) REVERSE DIRECTORY FOR FACILITATING ACCESSES INVOLVING A LOWER-LEVEL CACHE

(75) Inventors: Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 94 days.

(21) Appl. No.: 10/061,502

(22) Filed: Jan. 31, 2002

(65) Prior Publication Data

US 2002/0178329 A1 Nov. 28, 2002

Related U.S. Application Data

(60) Provisional application No. 60/283,254, filed on Apr. 11, 2001.

(51) Int. Cl.[7] .............................................. G06F 12/08
(52) U.S. Cl. .................... 711/122; 711/128; 711/133
(58) Field of Search ................................ 711/122, 128, 711/133

(56) References Cited

U.S. PATENT DOCUMENTS

| | | | | |
|---|---|---|---|---|
| 5,375,220 A | * | 12/1994 | Ishikawa | 711/141 |
| 5,530,832 A | * | 6/1996 | So et al. | 711/122 |
| 5,553,263 A | * | 9/1996 | Kalish et al. | 711/127 |
| 5,875,642 A | * | 3/1999 | Lee et al. | 62/256 |
| 5,890,217 A | * | 3/1999 | Kabemoto et al. | 711/141 |
| 6,122,709 A | * | 9/2000 | Wicki et al. | 711/118 |
| 6,151,655 A | * | 11/2000 | Jones et al. | 710/244 |
| 6,338,119 B1 | * | 1/2002 | Anderson et al. | 711/135 |
| 6,470,422 B2 | * | 10/2002 | Cai et al. | 711/129 |
| 2002/0010836 A1 | * | 1/2002 | Barroso et al. | 711/122 |

* cited by examiner

*Primary Examiner*—Hiep T. Nguyen
(74) *Attorney, Agent, or Firm*—Park, Vaughan & Fleming LLP

(57) ABSTRACT

One embodiment of the present invention provides a multiprocessor system that includes a number of processors with higher-level caches that perform memory accesses through a lower-level cache. This multiprocessor system also includes a reverse directory coupled to the lower-level cache, which includes entries corresponding to lines in the higher-level caches, wherein each entry identifies an associated entry in the lower-level cache. In one embodiment of the present invention, the higher-level cache is a set-associative cache, and storing the information within the reverse directory specifies a way location in the higher-level cache in which the line is to be stored. The system is configured to use this way information during a subsequent invalidation operation to invalidate the line in the higher-level cache without having to perform a lookup in the higher-level cache to determine the way location of the line in the higher-level cache.

30 Claims, 7 Drawing Sheets

REVERSE DIRECTORY FOR FACILITATING ACCESSES INVOLVING A LOWER-LEVEL CACHE

RELATED APPLICATION

This application hereby claims priority under 35 U.S.C. §119 to U.S. Provisional Patent Application No. 60/283,254, filed on Apr. 11, 2001, entitled "Reverse Directory for Facilitating Accesses Involving a Lower-Level Cache," by inventors Shailender Chaudhry and Marc Tremblay.

BACKGROUND

1. Field of the Invention

The present invention relates the design of multiprocessor systems, More specifically, the present invention relates to a method and an apparatus for using a reverse directory located at a lower-level cache to facilitate operations involving higher-level caches that perform accesses through the lower-level cache.

2. Related Art

In order to achieve high rates of computational performance, computer system designers are beginning to employ multiple processors that operate in parallel to perform a single computational task. One common multiprocessor design includes a number of processors 151–154 coupled to level one (L1) caches 161–164 that share a single level two (L2) cache 180 and a memory 183 (see FIG. 1A). During operation, if a processor 151 accesses a data item that is not present in local L1 cache 161, the system attempts to retrieve the data item from L2 cache 180. If the data item is not present in L2 cache 180, the system first retrieves the data item from memory 183 into L2 cache 180, and then from L2 cache 180 into L1 cache 161.

Note that coherence problems can arise if a copy of the same data item exists in more than one L1 cache. In this case, modifications to a first version of a data item in L1 cache 161 may cause the first version to be different than a second version of the data item in L1 cache 162.

In order to prevent coherency problems, computer systems often provide a coherency protocol that operates across bus 170. A coherency protocol typically ensures that if one copy of a data item is modified in L1 cache 161, other copies of the same data item in L1 caches 162–164, in L2 cache 180 and in memory 183 are updated or invalidated to reflect the modification.

Coherence protocols typically perform invalidations by broadcasting invalidation messages across bus 170. If such invalidations occur frequently, these invalidation messages can potentially tie up bus 170, and can thereby degrade overall system performance.

In order to remedy this problem, some designers have begun to explore the possibility of maintaining directory information within L2 cache 180. This directory information specifies which L1 caches contain copies of specific data items. This allows the system to send invalidation information to only the L1 caches that contain the data item instead of sending a broadcast message to all L1 caches. (This type of system presumes that there exist separate communication pathways for invalidation messages to each of the L1 caches 161–164, unlike the example illustrated in FIG. 1A, which uses a single shared bus 170 to communicate with L1 caches 161–164.)

However, note that storing directory information for each entry in L2 cache 180 is wasteful because L2 cache 180 typically has many more entries than L1 caches 161–164. This means that most of the entries for directory information in L2 cache 180 will be empty.

Furthermore, note that L1 caches 161–164 are typically set-associative. Hence, when an invalidation message is received by L1 cache 161, a lookup and comparison must be performed in L1 cache 161 to determine the way location of the data item. For example, in a four-way set-associative L1 cache, a data item that belongs to a specific set (that is specified by a portion of the address) can be stored in one of four possible "ways". Consequently, tags from each of the four possible ways must be retrieved and compared to determine the way location of the data item. This lookup is time-consuming and can degrade system performance.

What is needed is a method and an apparatus for maintaining directory information for L1 caches without wasting memory.

Furthermore, what is needed is a method and an apparatus for invalidating an entry in an L1 cache without performing a lookup to determine the way location of the entry.

SUMMARY

One embodiment of the present invention provides a multiprocessor system that includes a number of processors with higher-level caches that perform memory accesses through a lower-level cache. This multiprocessor system also includes a reverse directory coupled to the lower-level cache, which includes entries corresponding to lines in the higher-level caches, wherein each entry identifies an associated entry in the lower-level cache.

In one embodiment of the present invention, the lower-level cache is configured to receive a request from a higher-level cache to retrieve a line from the lower-level cache. If the line is present within the lower-level cache, the system sends the line to the higher-level cache so that the line can be stored in the higher-level cache. The system also stores information in the reverse directory to indicate that the line is stored in the higher-level cache.

In a variation on this embodiment, the higher-level cache is an N-way set-associative cache, and storing the information in the reverse directory involves storing way information identifying a way location in the higher-level cache in which the line is to be stored. The multiprocessor system is additionally configured to use this way information during a subsequent invalidation operation to invalidate the line in the higher-level cache without having to perform a lookup in the higher-level cache to determine the way location of the line in the higher-level cache.

In one embodiment of the present invention, the lower-level cache is additionally configured to generate a miss to pull the line into the lower-level cache, if the line is not present within the lower-level cache.

In one embodiment of the present invention, upon receiving an update request that causes a target entry in the lower-level cache to be updated, the system performs a lookup in the reverse directory to determine if the target entry is contained in one or more higher-level caches. For each higher-level cache that contains the target entry, the system sends an invalidation request to the higher-level cache to invalidate the target entry, and updates a corresponding entry in the reverse directory to indicate that the target entry has been invalidated in the higher-level cache.

Note that this update request can include, a load miss, a store miss, and a store hit on the target entry. If the update request is a store hit, the lookup in the reverse directory involves looking up the target entry in all higher-level caches, except for a higher-level cache that caused the store hit.

In one embodiment of the present invention, the reverse directory includes a fixed entry corresponding to each entry in each of the higher-level caches.

In one embodiment of the present invention, each entry in the reverse directory includes information specifying a location of a corresponding entry in the lower-level cache.

In one embodiment of the present invention, the lower-level cache is organized as an M-way set associative cache. In this embodiment, each entry in the reverse directory includes: a way identifier that identifies a way location of a corresponding entry within the lower-level cache; a set identifier that identifies a set location of the corresponding entry within the lower-level cache, wherein the set identifier does not include set information that can be inferred from a location of the entry within the reverse directory; and a valid flag indicating whether the entry in the reverse directory is valid.

In one embodiment of the present invention, the multiprocessor system is located on a single semiconductor chip.

In one embodiment of the present invention, the lower-level cache is an L2 cache, and each of the higher-level caches is an L1 cache.

In one embodiment of the present invention, the higher-level caches are organized as write-through caches, so that updates to the higher-level caches are immediately written through to the lower-level cache.

In one embodiment of the present invention, the lower-level cache includes multiple banks that can be accessed in parallel.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Multiprocessor System

Figure 1A:
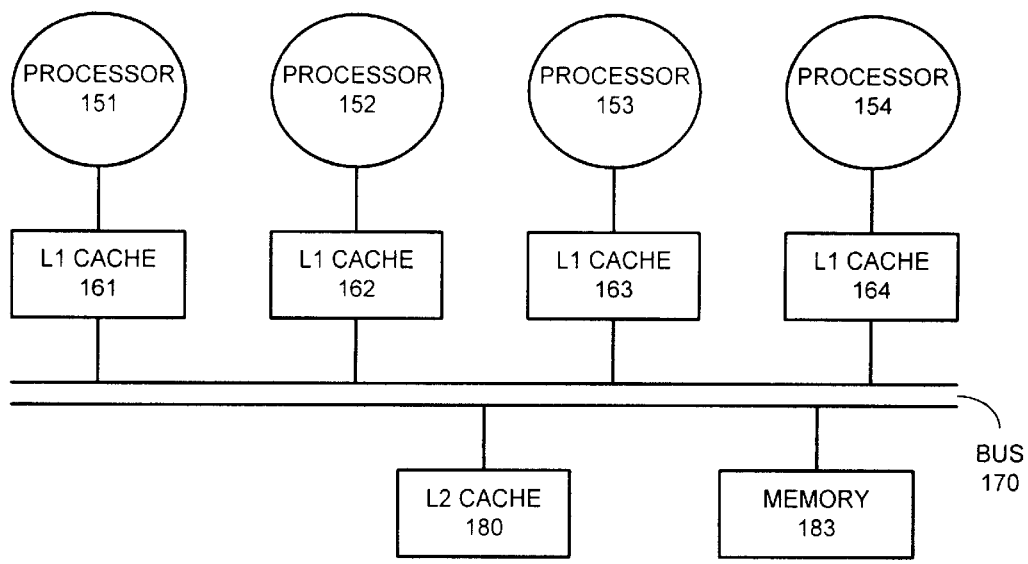
FIG. 1A illustrates a multiprocessor system.
Figure 1B:
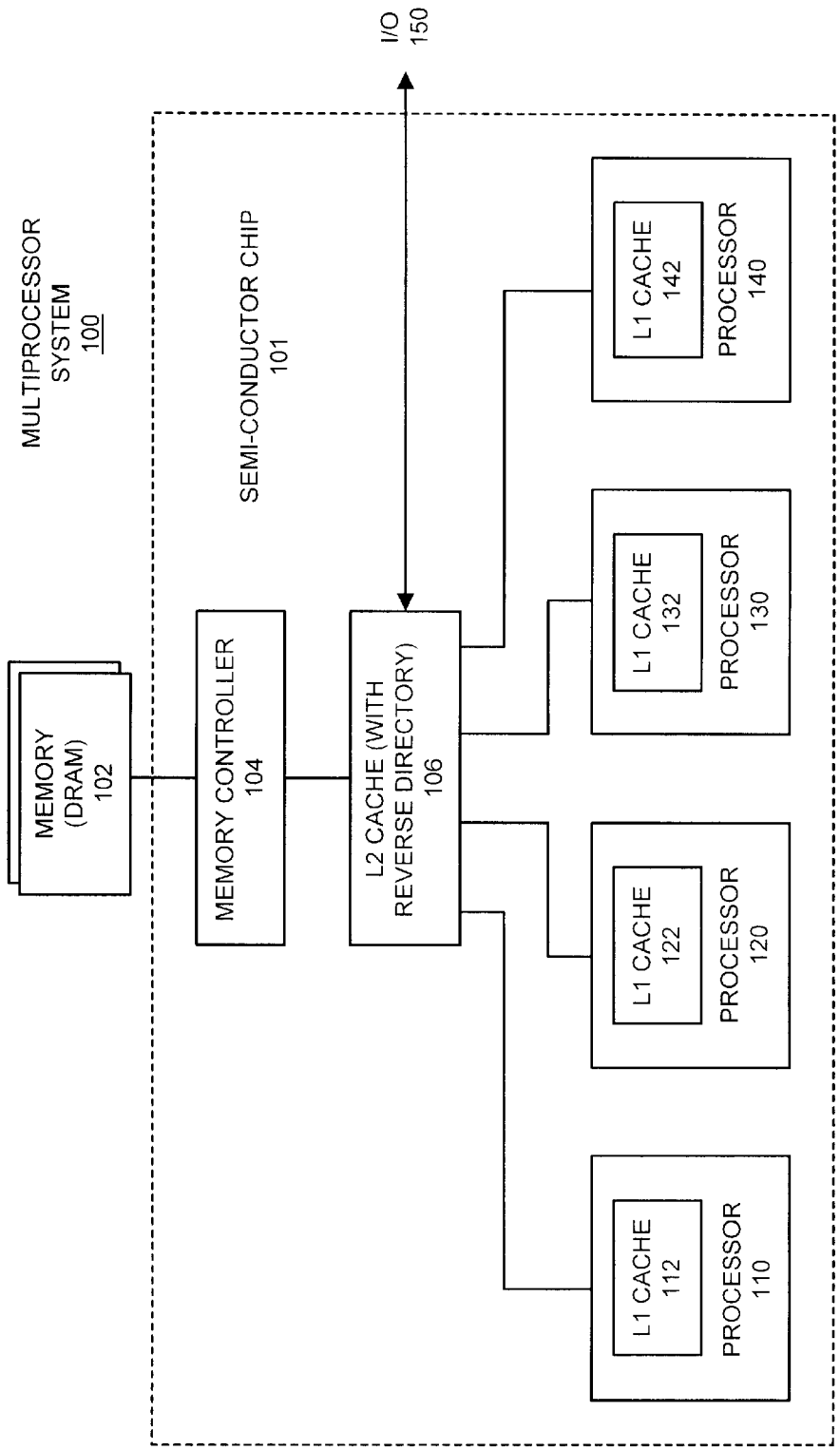
FIG. 1B illustrates a multiprocessor system with a reverse directory in accordance with an embodiment of the present invention.

FIG. 1B illustrates a multiprocessor system 100 with a reverse directory in accordance with an embodiment of the present invention. Note much of multiprocessor system 100 is located within a single semiconductor chip 101. More specifically, semiconductor chip 101 includes a number of processors 110, 120, 130 and 140, which contain level one (L1) caches 112, 122, 132 and 142, respectively. Note that the L1 caches 112, 122, 132 and 142 may be separate instruction and data caches, or alternatively, unified instruction/data caches. L1 caches 112, 122, 132 and 142 are coupled to level two (L2) cache 106, which includes a reverse directory 302, which is described in more detail with reference to FIGS. 3–6 below. L2 cache 106 is coupled to off-chip memory 102 through memory controller 104.

In one embodiment of the present invention, L1 caches 112, 122, 132 and 142 are write-through caches, which means that all updates to L1 caches 112, 122, 132 and 142 are automatically propagated to L2 cache 106. This simplifies the coherence protocol, because if processor 110 requires a data item that is present in L1 cache 112, processor 110 can receive the data from L2 cache 106 without having to wait for L1 cache 112 to source the data. Moreover, no forwarding network is needed to allow L1 cache 112 to source the data. Note that in one embodiment of the present invention, L2 cache 106 is an "inclusive cache", which means that all items in L1 caches 112, 122, 132 and 142 are included in L2 cache 106.

L2 Cache with Multiple Banks

Figure 2:
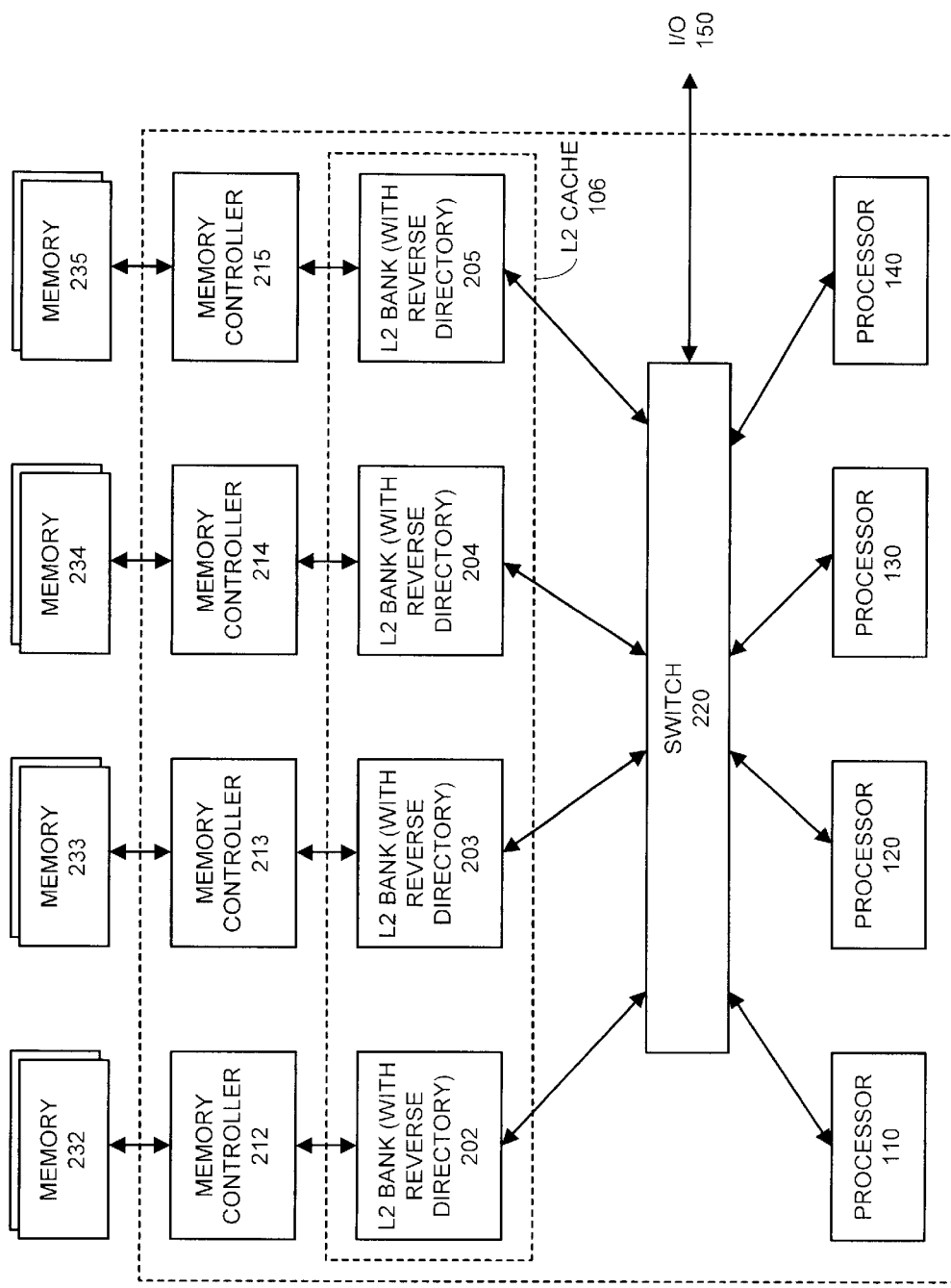
FIG. 2 illustrates an L2 cache with multiple banks within a multiprocessor system in accordance with an embodiment of the present invention.

FIG. 2 illustrates an L2 cache 106 with multiple banks in accordance with an embodiment of the present invention. In this embodiment, L2 cache 106 is implemented with four banks 202–205, which can be accessed in parallel by processors 110, 120, 130 and 140 through switch 220. Note that only two bits of the address are required to determine which of the four banks 202–205 a memory request is directed to. Switch 120 additionally includes an I/O port 150 for communicating with I/O devices. Also note that each of these banks 202–205 includes a reverse directory. Furthermore, each of the banks 202–205 has its own memory controller 212–215, which is coupled to an associated bank of off-chip memory 232–235.

Note that with this architecture, it is possible to concurrently connect each L1 cache to its own bank of L2 cache, which increases the bandwidth to the L2 cache 106.

Reverse Directory

Figure 3:
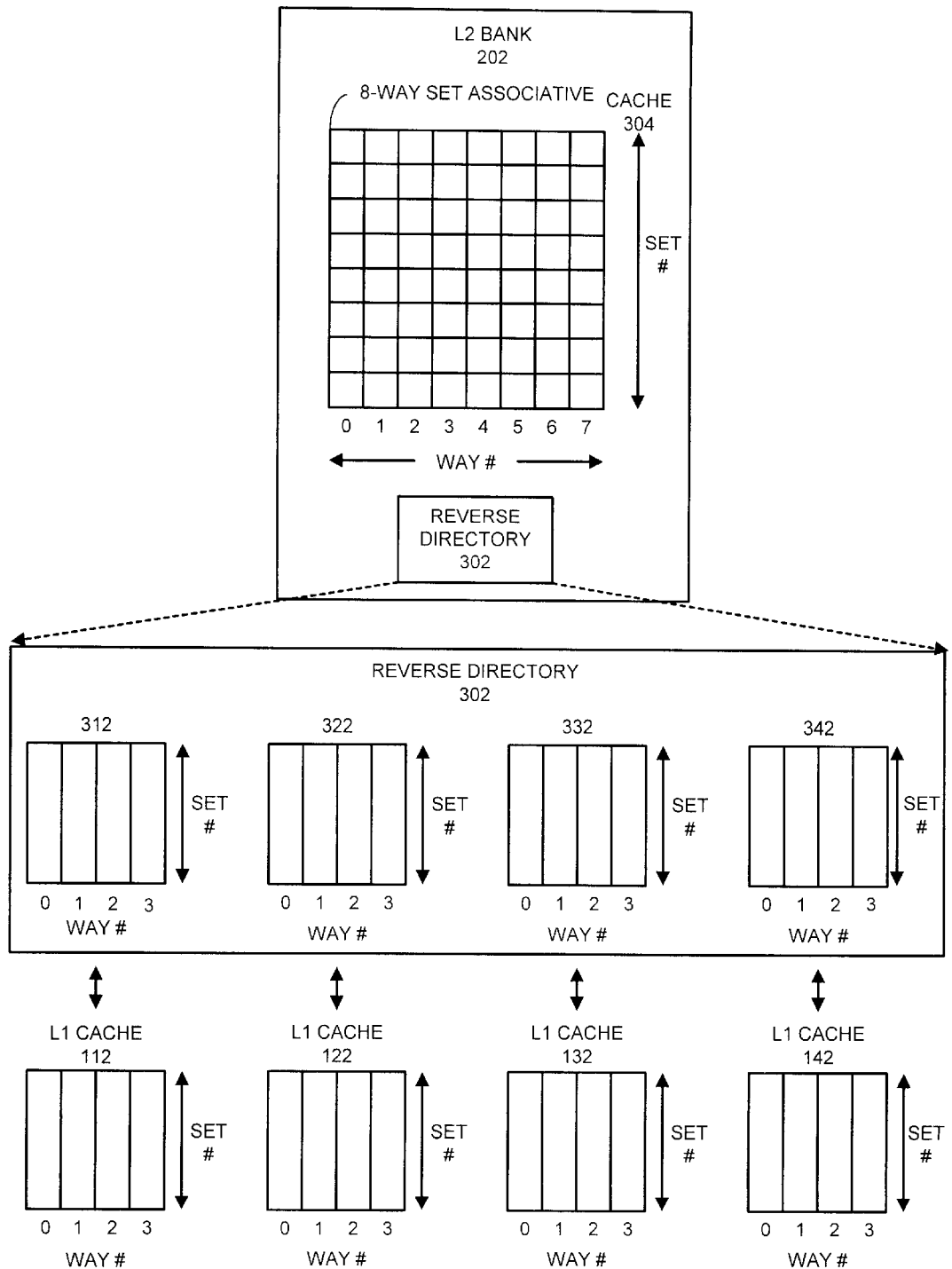
FIG. 3 illustrates a reverse directory in accordance with an embodiment of the present invention.

FIG. 3 illustrates L2 bank 202 along with an associated reverse directory 302 in accordance with an embodiment of the present invention. L2 bank 202 contains an eight-way set associative cache 304 for storing instructions and data. A portion of the address is used to determine a set within cache 304, which is represented by a row of cache 304. Within a given set, eight different entries can be stored in each of eight different "way locations," which are represented by the eight columns in cache 304.

Reverse directory 302 includes a separate block for each L1 cache. More specifically, block 312 is associated with L1 cache 112, block 322 is associated with L1 cache 122, block 332 is associated with L1 cache 132, and block 342 is associated with L1 cache 142.

Note that each of these blocks 312, 322, 332 and 342 includes an entry for each line in the associated L1 caches 112, 122, 132 and 142. Moreover, since L1 cache 112 is organized as a four-way set associative cache, the associated block 312 within reverse directory 302 is also organized in the same fashion. However, note that entries within L1 cache 112 contain data and instructions, whereas entries within the associated block 312 contain indexing information specifying a location of the line within cache 304.

Reverse Directory Entry

Figure 4:
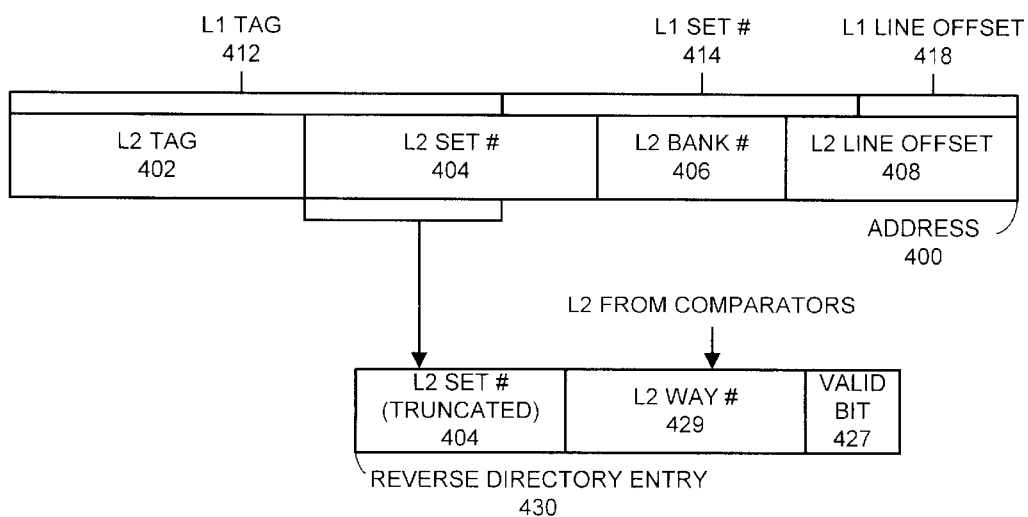
FIG. 4 illustrates a reverse directory entry in accordance with an embodiment of the present invention.

FIG. 4 illustrates how a reverse directory entry 430 is created in accordance with an embodiment of the present invention.

The top portion of FIG. 4 illustrates an address 400 of a data item (or instruction) within memory 102. L1 cache 112 divides this address into L1 tag 412, L1 set number 414, and L1 line offset 418. L1 set number 414 is used to look up a specific set of the four-way set-associative L1 cache 112. L1 tag 412 is stored in L1 cache 112, and is used to perform comparisons for purposes of implementing the four-way set-associative memory for each set. L1 line offset 418 determines a location of a specific data item within the line in L1 cache 112.

L2 cache 106 divides address 400 into L2 tag 402, L2 set number 404, L2 bank number 406 and L2 line offset 408. L2 bank number 406 determines a specific bank from the four banks 202–205 of L2 cache 106. L2 set number 404 is used to look up a specific set of the eight-way set-associative bank of L2 cache 106. L2 tag 402 is stored in a specific bank of L2 cache 106, and is used to perform comparisons for purposes of implementing the eight-way set-associative memory for each set. L2 line offset 408 determines a location of a specific data item within the line in L2 cache 106.

The associated entry 430 for address 400 within reverse directory 302 contains truncated L2 set number 424, L2 way number 429 and valid bit 427. Truncated L2 set number 424 includes the portion of L2 set number 404 which cannot be determined from the location of the entry within L1 cache 112. In other words, it contains the portion of L2 set number 404, which does not overlap with L1 set number 414. L2 way number 429 contains a three-bit index which specifies a column location of the line, out of the eight possible way locations for the line, in cache 304. Finally, valid bit 427 indicates whether entry 430 is valid.

Note that instead of storing an L1 cache location for each line within L2 cache 106, the illustrated embodiment stores an entry for each L1 cache location, and each of these entries specifies an L2 cache location that is associated with the L1 location.

Hence, one can think of directory 302 as a "reverse directory" because instead of keeping a pointer to an L1 entry from each L2 entry, it keeps a pointer in the reverse direction from each L1 entry to a corresponding L2 entry. This saves memory because there are typically many fewer L1 entries than L2 entries.

Process of Creating a Reverse Directory Entry

Figure 5:
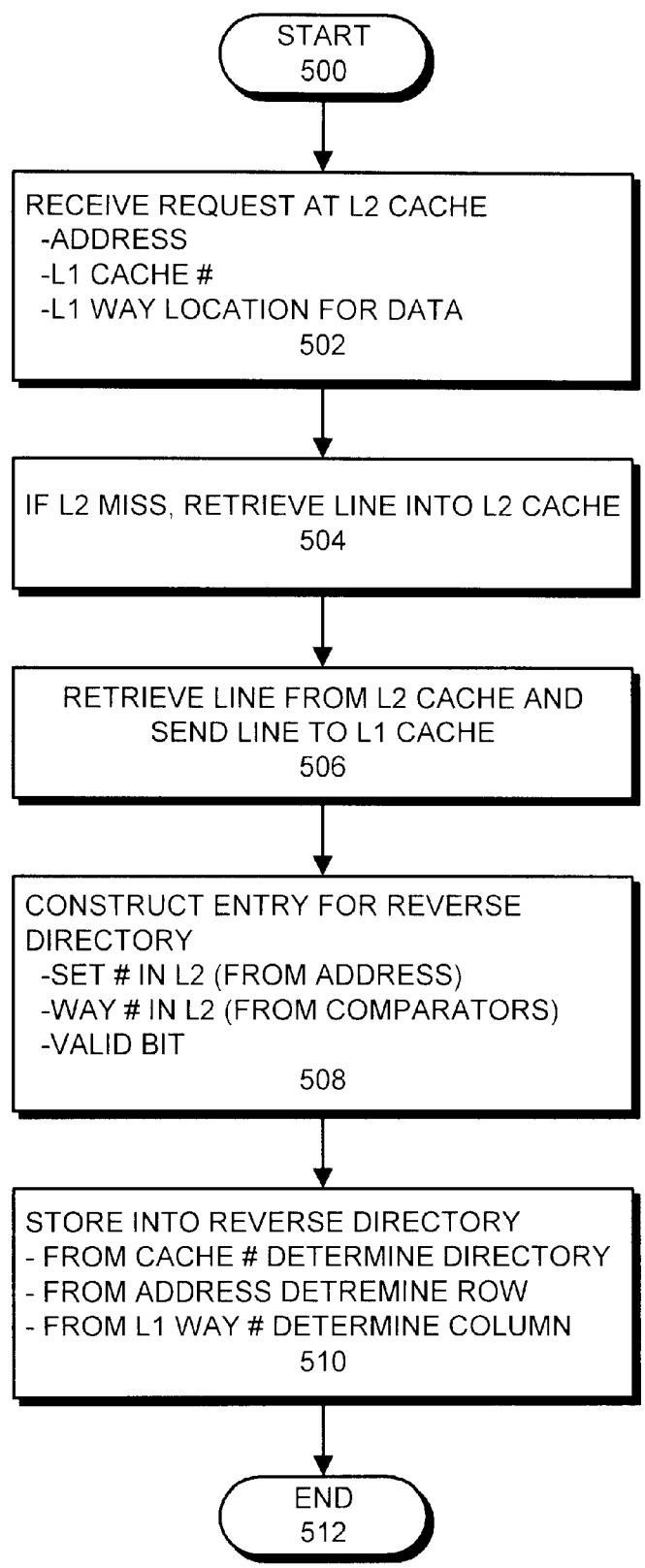
FIG. 5 is a flow chart illustrating the process of creating or updating a reverse directory entry in accordance with an embodiment of the present invention.

FIG. 5 is a flow chart illustrating the process of creating or updating a reverse directory entry in accordance with an embodiment of the present invention. The process starts when a request to retrieve a line is received at L2 cache 106 from L1 cache 112 (step 502). This request includes address 400, an L1 cache number that identifies L1 cache 112, and a way location in L1 cache 112 into which the line will be stored after it is retrieved.

Next, if the request generates a miss in L2 cache 106, the system retrieves the line into L2 cache 106 from memory 102 (step 504). If this retrieval causes and existing entry in L2 cache 106 to be invalidated, then the corresponding entries in reverse directory 302 may have to be invalidated.

The system then retrieves the line from L2 cache 106 and sends to line to L1 cache 112 (step 506).

The system also constructs an entry 430 for reverse directory 302 (step 508). This entry includes truncated L2 set number 424, L2 way number 429 and valid bit 427 as is descried above with reference to FIG. 4.

The system then stores the entry into a location in reverse directory 302 (step 510). The location is determined by a number of items. From L2 bank number 406, the system knows to look into L2 bank 202. From the L1 cache number, the system knows to look a block 312, which is associated with L1 cache 112. From address 400, the system determines a row that is associated with a specific L1 set. From the L1 way location received with the request, the system determines a column within the row.

Process of Using a Reverse Directory Entry

Figure 6:
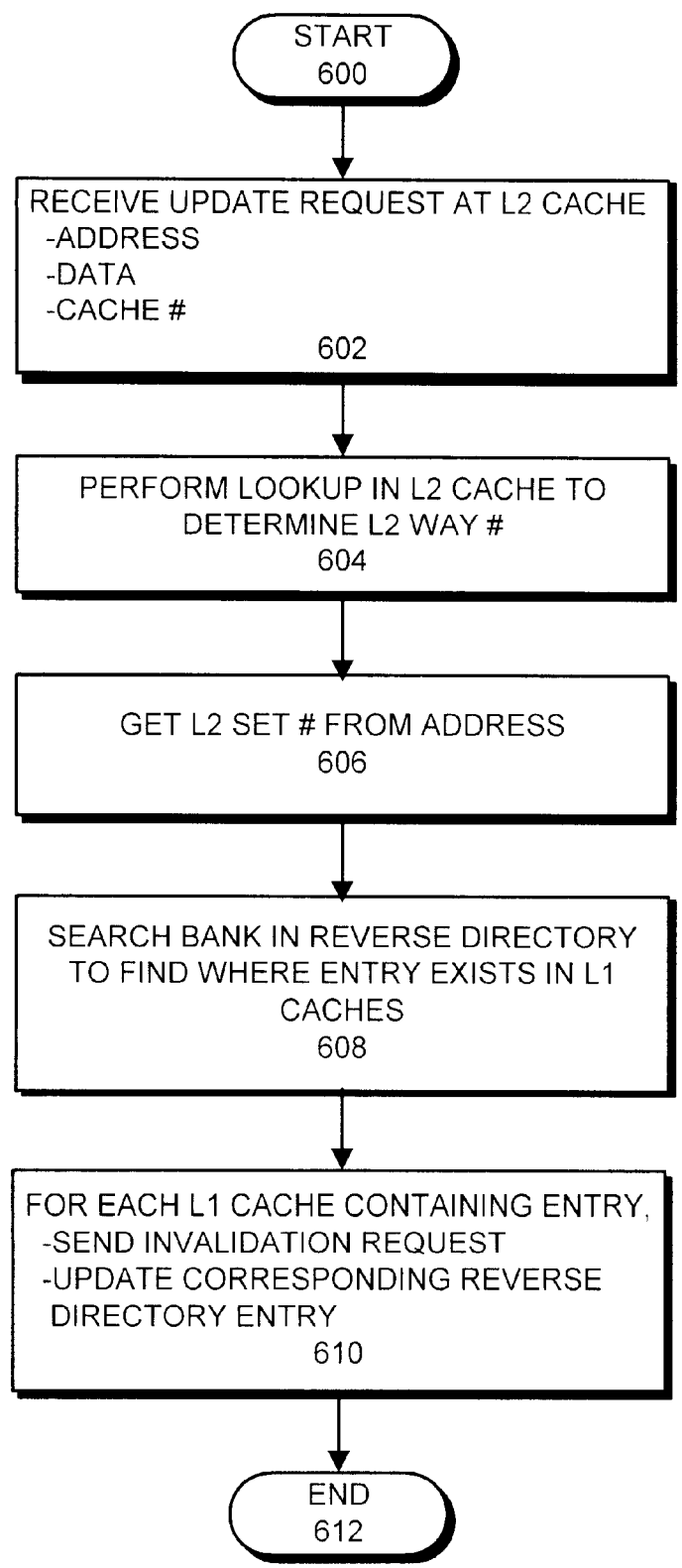
FIG. 6 is a flow chart illustrating the process of using reverse directory entries to perform invalidations in accordance with an embodiment of the present invention.

FIG. 6 is a flow chart illustrating the process of using reverse directory entries to perform invalidations in accordance with an embodiment of the present invention. The system starts by receiving a request that causes an update of L2 cache 106 (step 602). This request can include: a store hit on the target entry by another processor, a load miss, or a store miss.

Next, the system reconstructs the entry for the request in reverse directory 302. This is accomplished by performing a lookup in L2 cache 106 to determine the L2 way number 429 in which the target entry is located (step 604), and retrieving the L2 set number 404 from address 400 as is illustrated in FIG. 4 (step 606). These values are combined to construct the reverse directory entry 130.

Next, the system uses this entry to search reverse directory 302 in order to determine which L1 caches contain the entry (step 608). Note that the system only has to search the reverse directory that is associated a bank of L2 cache 206 that is specified by L2 bank number 406. Furthermore, the set number within the reverse directory can be determined from the address, which means that the search only has to consider entries in the four possible "ways" for each set. Also note that if the request is a store hit by another processor, the system does not have to search the bank for the processor that caused the store hit.

For each L1 cache that contains the entry, the system sends an invalidation message to the L1 cache. This invalidation message includes the L1 way number, so that an associative lookup in the L1 cache can be avoided. The system also updates the corresponding reverse directory entry to indicate that it has been invalidated (step 610).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A multiprocessor system, comprising:
   a plurality of processors;
   a lower-level cache;
   a plurality of higher-level caches coupled to the plurality of processors;
   wherein each of the plurality of higher-level caches is configured to perform memory accesses through the lower-level cache;
   a reverse directory coupled to the lower-level cache;
   wherein the reverse directory includes entries for lines in the plurality of higher-level caches, wherein each entry identifies an associated entry in the lower-level cache.

2. The multiprocessor system of claim 1, wherein the lower-level cache is configured to:
   receive a request from a higher-level cache to retrieve a line from the lower-level cache; and if the line is present within the lower-level cache, the lower-level cache is configured to:
send the line to the higher-level cache so that the line can be stored in the higher-level cache, and to
store information in the reverse directory to indicate that the line is stored in the higher-level cache.

3. The multiprocessor system of claim 2,
wherein the higher-level cache is an N-way set-associative cache; and
wherein storing the information in the reverse directory involves storing way information identifying a way location in the higher-level cache in which the line is to be stored.

4. The multiprocessor system of claim 3, wherein the multiprocessor system is additionally configured to use the way information during a subsequent invalidation operation to invalidate the line in the higher-level cache without having to perform a lookup in the higher-level cache to determine the way location of the line in the higher-level cache.

5. The multiprocessor system of claim 2, wherein the lower-level cache is additionally configured to generate a miss to pull the line into the lower-level cache, if the line is not present within the lower-level cache.

6. The multiprocessor system of claim 1, wherein the lower-level cache is additionally configured to:
receive an update request that causes a target entry in the lower-level cache to be updated;
perform a lookup in the reverse directory to determine if the target entry is contained in one or more higher-level caches; and
for each higher-level cache that contains the target entry, to
send an invalidation request to the higher-level cache to invalidate the target entry, and to
update a corresponding entry in the reverse directory to indicate that the target entry has been invalidated in the higher-level cache.

7. The multiprocessor system of claim 6, wherein the update request includes one of:
a load miss;
a store miss; and
a store hit on the target entry.

8. The multiprocessor system of claim 7, wherein if the update request is a store hit, the lookup in the reverse directory involves looking up the target entry in the plurality of higher-level caches, except for a higher-level cache that caused the store hit.

9. The multiprocessor system of claim 1, wherein the reverse directory includes a fixed entry corresponding to each entry in each of the plurality of higher-level caches.

10. The multiprocessor system of claim 9, wherein each entry in the reverse directory includes information specifying a location of a corresponding entry in the lower-level cache.

11. The multiprocessor system of claim 9,
wherein the lower-level cache is organized as an M-way set associative cache; and
wherein each entry in the reverse directory includes,
a way identifier that identifies a way location of a corresponding entry within the lower-level cache,
a set identifier that identifies a set location of the corresponding entry within the lower-level cache, wherein the set identifier does not include set information that can be inferred from a location of the entry within the reverse directory; and a valid flag indicating whether the entry in the reverse directory is valid.

12. The multiprocessor system of claim 1, wherein the multiprocessor system is located on a single semiconductor chip.

13. The multiprocessor system of claim 1,
wherein the lower-level cache is an L2 cache; and
wherein each of the plurality of higher-level caches is an L1 cache.

14. The multiprocessor system of claim 1, wherein the plurality of higher-level caches are organized as write-through caches, so that updates to the plurality of higher-level caches are immediately written through to the lower-level cache.

15. The multiprocessor system of claim 1, wherein the lower-level cache includes multiple banks that can be accessed in parallel.

16. A single-chip multiprocessor system, comprising:
a semiconductor chip;
a plurality of processors within the semiconductor chip;
an L2 cache within the semiconductor chip;
a plurality of L1 caches within the semiconductor chip and coupled to the plurality of processors;
wherein each of the plurality of L1 caches is configured to perform memory accesses through the L2 cache;
wherein the plurality of L1 caches are organized as write-through caches, so that updates to the plurality of L1 caches are immediately written through to the L2 cache; and
a reverse directory coupled to the L2 cache;
wherein the reverse directory includes a fixed entry corresponding to each entry in each of the plurality of L1 caches, wherein each fixed entry identifies an associated entry in the L2 cache.

17. A method that operates in a computer system that includes a plurality of higher-level caches that access data through a lower-level cache, the method comprising:
receiving a request from a higher-level cache to retrieve a line from the lower-level cache; and
if the line is present within the lower-level cache,
sending the line to the higher-level cache so that the line can be stored in the higher-level cache, and
storing information in a reverse directory located at the lower-level cache to indicate that the line is stored in the higher-level cache;
wherein the reverse directory includes entries for lines in the plurality of higher-level caches, wherein each entry identifies an associated entry in the lower-level cache.

18. The method of claim 17,
wherein the higher-level cache is an N-way set-associative cache; and
wherein storing the information in the reverse directory involves storing way information identifying a way location in the higher-level cache in which the line is to be stored.

19. The method of claim 18, wherein the method further comprises using the way information during a subsequent invalidation operation to invalidate the line in the higher-level cache without having to perform a lookup in the higher-level cache to determine the way location of the line in the higher-level cache.

20. The method of claim 17, wherein the method further comprises:
receiving an update request that causes a target entry in the lower-level cache to be updated; and performing a lookup in the reverse directory to determine if the target entry is contained in one or more higher-level caches; and for each higher-level cache that contains the target entry, sending an invalidation request to the higher-level cache to invalidate the target entry, and updating a corresponding entry in the reverse directory to indicate that the target entry has been invalidated in the higher-level cache.

21. The method of claim 20, wherein the update request includes one of:

a load miss;

a store miss; and a store hit on the target entry.

22. The method of claim 21, wherein if the update request is a store hit, the lookup in the reverse directory involves looking up the target entry in the plurality of higher-level caches except for a higher-level cache that caused the store hit.

23. The method of claim 17, wherein the reverse directory includes a fixed entry corresponding to each entry in each of the plurality of higher-level caches.

24. The method of claim 23, wherein each fixed entry in the reverse directory includes information specifying a location of a corresponding entry in the lower-level cache.

25. The method of claim 23, wherein the lower-level cache is organized as an M-way set associative cache; and wherein each entry in the reverse directory includes, a way identifier that identifies a way location of a corresponding entry within the lower-level cache, a set identifier that identifies a set location of the corresponding entry within the lower-level cache, wherein the set identifier does not include set information that can be inferred from a location of the entry within the reverse directory; and a valid flag indicating whether the entry in the reverse directory is valid.

26. The method of claim 17, wherein the method further comprises generating a miss in the lower-level cache to pull the line into the lower-level cache, if the line is not present within the lower-level cache.

27. The method of claim 17, wherein the plurality of higher-level caches and the lower-level cache are located on a single semiconductor chip; and wherein each of the plurality of higher-level caches is coupled to an associated processor located on the single semiconductor chip.

28. The method of claim 17, wherein the lower-level cache is an L2 cache; and wherein each of the plurality of higher-level caches is an L1 cache.

29. The method of claim 17, wherein the plurality of higher-level caches are organized as write-through caches, so that updates to the plurality of higher-level caches are immediately written through to the lower-level cache.

30. The method of claim 17, wherein the lower-level cache includes multiple banks that can be accessed in parallel.

* * * * *